(12) United States Patent
Anderson (10) Patent No.: US 6,230,951 B1
(45) Date of Patent: May 15, 2001

(54) PROTECTIVE BAG FOR A SURFBOARD ENCOMPASSING TRAVEL, STORAGE/ DISPLAY AND TRANSPORTATION FEATURES

(76) Inventor: William R. Anderson, 31351 Via Colinas, Suite 204, Westlake Village, CA (US) 91362

( * ) Notice: Subject to any disclaimer, the term of this patent is extended or adjusted under 35 U.S.C. 154(b) by 0 days.

(21) Appl. No.: 09/528,578

(22) Filed: Mar. 20, 2000

(51) Int. Cl.7 .............................. A45F 4/00; B60R 9/055; B60R 9/058
(52) U.S. Cl. .................... 224/585; 224/318; 224/329; 224/575; 224/579; 224/617; 224/653; 224/657
(58) Field of Search .................... 224/575, 579, 224/580, 584, 585, 607, 616, 617, 653, 657, 484, 309, 314, 315, 329

(56) References Cited

U.S. PATENT DOCUMENTS

| 3,000,418 | * | 9/1961 | Bitting | 224/575 |
|---|---|---|---|---|
| 3,000,419 | * | 9/1961 | Morrison | 224/575 |
| 3,316,951 | * | 5/1967 | Jacobson | 150/52 |
| 3,339,607 | * | 9/1967 | Howard | 150/52 |
| 4,483,380 | * | 11/1984 | Beran | 206/315.1 |
| 4,793,535 | * | 12/1988 | Johnson | 224/329 |
| 4,848,628 | * | 7/1989 | Lopez | 224/309 |
| 5,033,497 | * | 7/1991 | Hernandez | 206/315.1 |
| 5,094,344 | * | 3/1992 | Savage | 206/315.1 |
| 5,318,084 | * | 6/1994 | Jackson | 224/206 |
| 5,405,002 | * | 4/1995 | Troia | 206/315.1 |
| 5,538,169 | * | 7/1996 | Moore | 224/328 |
| 6,138,881 | * | 10/2000 | Paul et al. | 224/153 |

* cited by examiner

*Primary Examiner*—Stephen P. Garbe
(74) *Attorney, Agent, or Firm*—Skjerven Morrill MacPherson LLP (57) ABSTRACT

A bag for storing, carrying or holding on top of a vehicle a surfboard, wakeboard or snowboard that protects, stores, displays and travels all in one comprehensive product. The bag can be carried by handle or by an attachable shoulder strap. The bag can be displayed/stored on a wall, ceiling or garage rafters in both parallel or vertical positions using just two or all four straps. Due to its features, the bag is also capable of being strapped to the top of a vehicle (or in the bed of a truck) without any soft or hard racks being required on the vehicle or truck.

16 Claims, 9 Drawing Sheets

PROTECTIVE BAG FOR A SURFBOARD ENCOMPASSING TRAVEL, STORAGE/DISPLAY AND TRANSPORTATION FEATURES

FIELD OF INVENTION

This invention relates to the storage, display, safe-keeping and transportation of a surfboard, and in particular to a unitary protective board cover, board wall/ceiling rack for storage/display purposes and vehicle rack.

BACKGROUND

A surfboard is made up of fiberglass and foam. It is a very fragile piece of equipment and can be damaged extremely easily. Fiberglass is sensitive to pressure, stress and heat. The fins on a surfboard are also very sensitive to stress and can snap with ease. A surfboard can range from 4 to 10 ft. long, and can be as wide as 22 to 36 inches. Some boards, mainly "Longboards" (8–10 ft. in length), can weigh up to 25 lbs. Most "Shortboards" (5–7 ft. in length) weigh less than 10 lbs.

A surfer has various needs for safekeeping the board during both storage and traveling. One product for storage and travel is the "Board bag". There are many different types of "board bags". The make up of a "Board bag" has been materials like cotton, padded nylon and hard, plastic travel cases. Some bags can be as simple as a cloth material that is pulled over the board to keep it clean. Board bags that are padded, heat resistant and have carrying provisions, like a handle or a shoulder strap, are very useful in transporting the board and protecting the board from sun damage, heat or pressure dings. Board bags range in size and material depending on the surfboard size and traveling needs. There are some board bags that have room for two boards, various zippers for storing other objects, and have hard covers for traveling by air.

When a surfer is traveling by car, the board can be stored on top of the car using a surfboard rack. There are various types of car racks, but the most common racks for cars are usually either "hard racks" (permanent metal racks) or "soft racks" (portable padded racks). The board racks work by strapping the board to the padded rack on top of the vehicle.

Another need when owning a surfboard is safely storing the board while idle. There are various ways to store a surfboard, but the most popular seems to be the wall rack. The wall rack is made up of two "L" shaped, padded arms that screw into the wall. The board is then placed on the arms of the wall rack and is held suspended off the ground. One major problem with the wall rack is that it sticks out from the wall (about three feet) and it does not necessarily keep the board clean or safe from damage.

In the past, all of these needs have been met by acquiring different products, one for storing the surfboard, one for carrying the surfboard and one for mounting the surfboard on the roof of a car. What is needed is an improved board bag, which incorporates a board bag, wall/ceiling rack and vehicle transportation rack all in one product. The present invention fulfills these needs and many others.

SUMMARY OF THE INVENTION

Briefly and in general terms the present invention provides a surfer with a protective board bag, a wall or ceiling storage/display rack and a car rack all in one product. The surfboard is placed into a protected, padded board bag by opening (typically unzipping) the side of the board bag, placing the board in the bag and closing (typically rezipping) the bag. The bag with the board inside can then be carried by a handle or by a padded shoulder strap. For the purpose of this invention the bag used to carry a surfboard will be called the "Pro Bag". The Pro Bag has at least one zippered pocket that can store any unused components or accessories associated with the surfboard.

The Pro Bag can also be placed on the top of a vehicle with or without a roof rack and for traveling can be easily strapped down to the top of the vehicle with straps selectively placed (typically with clips or snaps) on the bag to hold the bag snugly against the vehicle roof in combination with "gutter units". The "gutter units" are easily attached to the ends of the straps and are wedged into or attached to the car roof gutters. Once the "gutter units" are in place, the straps can be hooked on to corresponding D-rings near the middle of the board bag and then pulled taut to keep the bag tight against the top of the vehicle. The Pro Bag has a padded underside that acts as a buffer between the car and the board bag. Other surfboards can also be strapped to the vehicle by placing the board bag on top of the other surfboards and strapping them down tightly together. When the Pro Bag needs to be taken off the vehicle, the surfer can easily loosen and unhook the straps, remove these straps from the bag and put these straps in the at least one zippered pocket for storage. The user can then clip onto the Pro Bag a padded shoulder harness for use in carrying the Pro Bag with the surfboard in it while walking.

As a feature of this invention, the Pro Bag can also be clipped to the back of a pick-up truck. Most pickup trucks come with at least four D-Rings in the bed of the truck. The Pro Bag can be connected to each D-Ring via the straps and clips and can be harnessed down in the bed of the truck. The straps can also be attached around other surfboards and clipped together for traveling with various boards.

When the Pro Bag needs to be stored in a safe place, it can be attached to wall, ceiling or garage rafters via "wall units" and straps with clips (two straps or four straps depending on the style of display) to be displayed in a safe and protected manner. The wall units can work with only two straps or with all four straps according to the manner in which the board is displayed. Once a surfer comes home, he or she can easily unclip the shoulder harness and clip the Pro Bag containing the board to the wall units using the same straps as used to mount the Pro Bag on top of a vehicle and adjust the straps according to the most desired display. Whether on the wall above a bed or strapped tight to the ceiling of a garage, the Pro Bag will be protected while out of the way and yet displayed.

The surfer can position the Pro Bag flat against the wall in a parallel or vertical position. The bag can also be stored flat (i.e. parallel) or vertically (i.e. with the long axis of the stored surfboard parallel to the ceiling with the plane of the surfboard perpendicular to the ceiling) on the ceiling. Once the board is clipped to the wall units, it lays flat and is protected from dirt, dings and daily traffic.

DESCRIPTION OF THE PREFERRED EMBODIMENTS

In the following description, which is illustrative only and not limiting, like reference numerals will be used to refer to like or corresponding elements in the different figures of the drawings.

Figure 1:
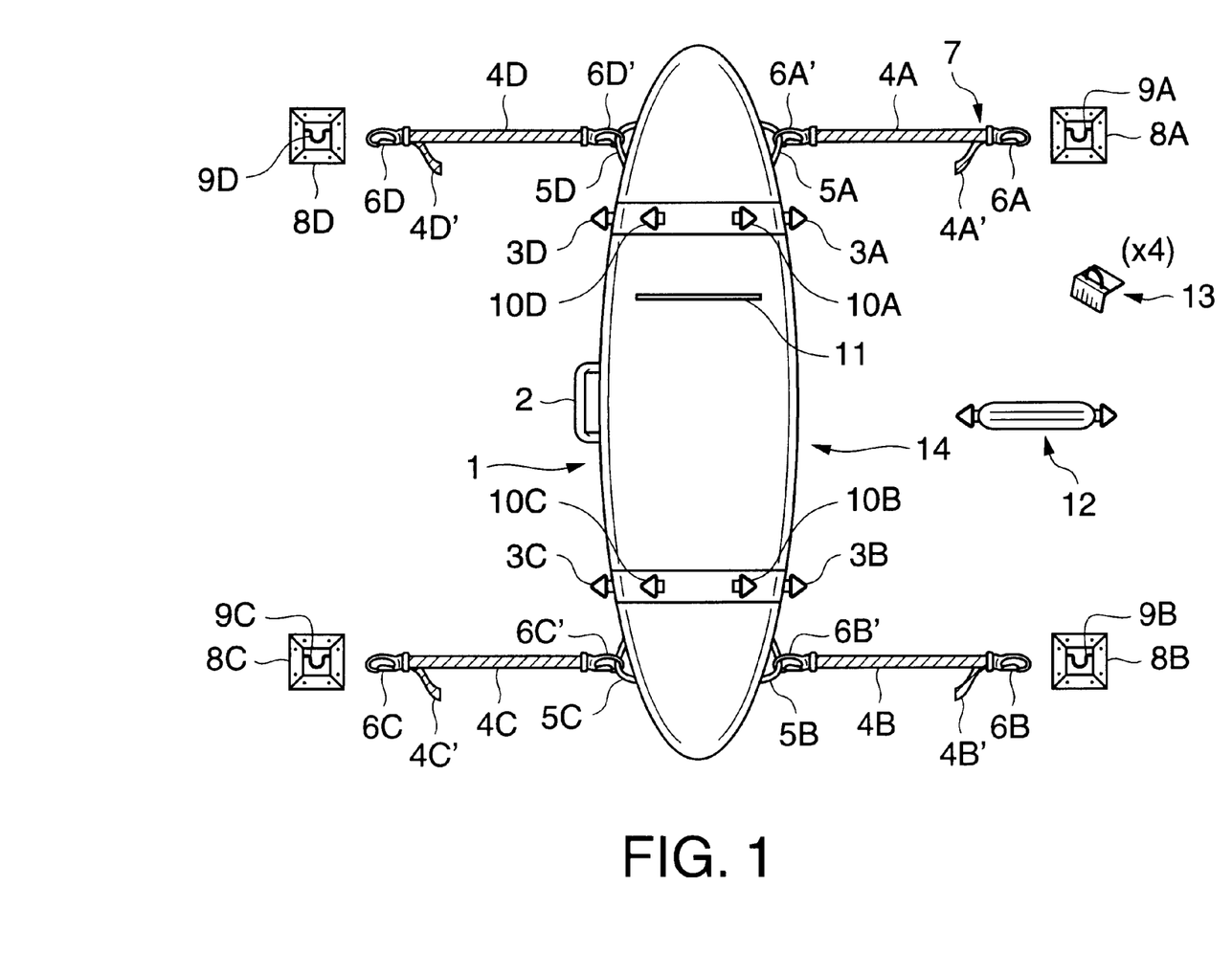
FIG. 1 is a view of the Pro Bag with its components.
Figure 2:
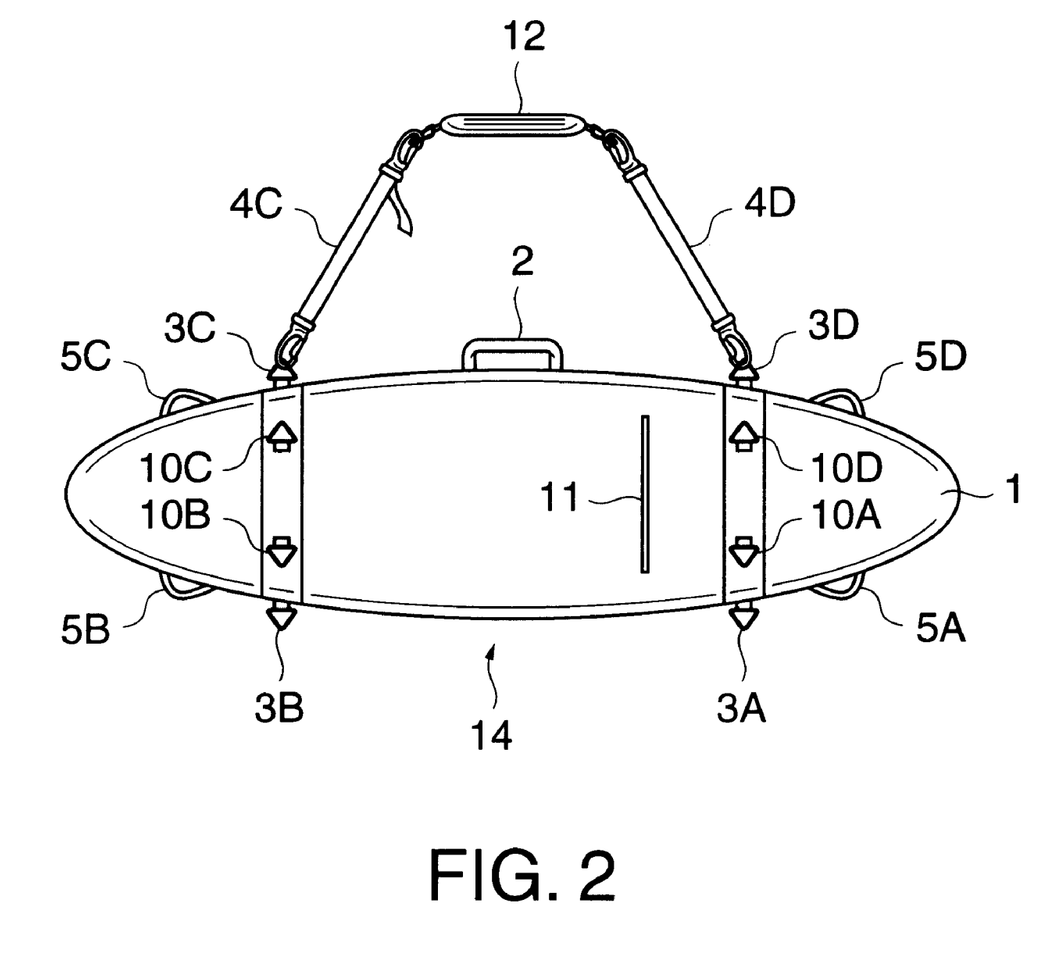
FIG. 2 presents a view of the Pro Bag with the shoulder strap component.

Referring now to the drawings, FIG. 1 shows one embodiment of the Pro Bag 1 with five main components: the webbing or straps 4A to 4D (typically but not necessarily nylon) and clips 6A to 6D and 6A' to 6D' (typically stainless steel; eight are shown in FIG. 1; see also FIG. 6), the "D-rings" 3A to 3D, 5A to 5D and 10A to 10D (see also FIG. 9), the "Wall Units" 8A to 8D (see also FIG. 8), the "Gutter Units" 13A to 15D (see also FIG. 7), and a padded shoulder strap 12 (see also FIG. 2). Strap 12 connects to loops 3A and 3B or to loops 3C and 3D using connecting straps 4C and 4D (FIG. 2) to allow the Pro Bag 1 to be easily carried on a person's shoulder. Attached to the ends of straps 4A to 4D are swivel clips 6A to 6D and 6A' to 6D' typically and preferably made of stainless steel, but any other suitable corrosion-resistant material can also be used, such as brass, bronze or plastic. A typical adjustable swivel clip 6 (as seen on both ends of each strap 4A, 4B, 4C and 4D) is designed to clip on to an appropriate one of the D-Rings 3A to 3D, 5A to 5D or 10A to 10D as required. Straps 4A to 4D can be adjusted to their desired lengths in a well-known manner by pulling on loose ends 4A' to 4D' which each pass through a locking buckles or mechanism of well-known design to hold taut straps 4A to 4D once adjusted but also to allow these straps to be loosened when necessary.

The Pro Bag 1 can be opened by a large zipper 14 (typically stainless steel but of any suitable material), for example, on the side of the bag and shown schematically in FIG. 1. Other structures such as velcro, snaps, or buttons, for example, can also be used to close the bag, if desired. The components that are not being used can be stored in a large pocket 11 (typically zippered but capable of being closed using velcro, snaps or buttons, if desired) on top of the bag.

Figure 6:
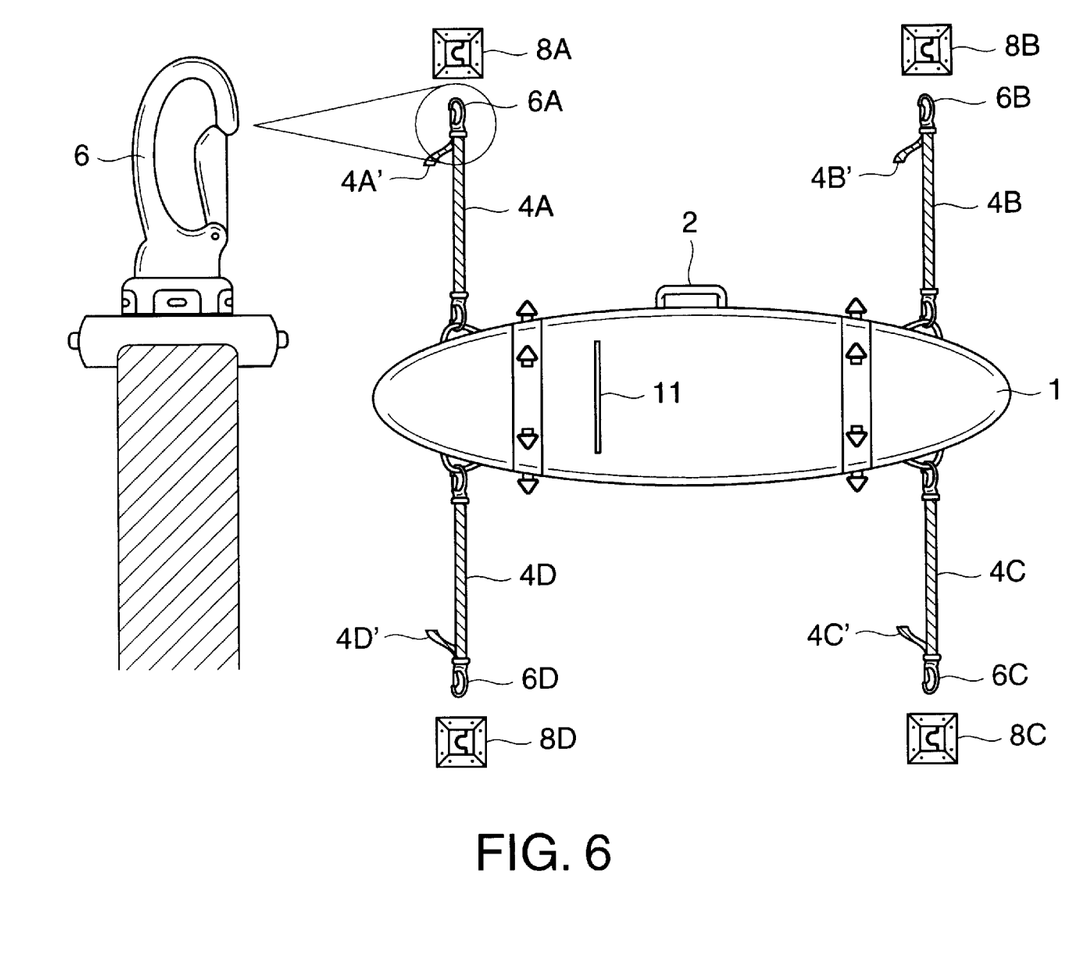
FIG. 6 presents an enlarged detail of the swivel clip.

To carry the Pro Bag 1 using the shoulder strap 12 (FIG. 2), the nylon straps 4C and 4D (FIG. 2) are attached to D-rings 3C and 3D and then clipped on to the shoulder strap 12 by means of the stainless steel clips such as clip 6 (FIG. 6). The Pro Bag 1 can also be carried by hand using the handle 2. The Pro Bag 1 is displayed/stored against the wall or ceiling by screwing the Wall Units 8A to 8D (FIG. 8) into the wall or ceiling and then by clipping two or four of the straps 4A to 4D to two (FIG. 3) or four (FIG. 4) swinging "U-rings" 9A to 9D rotatably mounted in wall units 8A to 8D (FIG. 8) depending on display and storage needs.

Figure 5A:
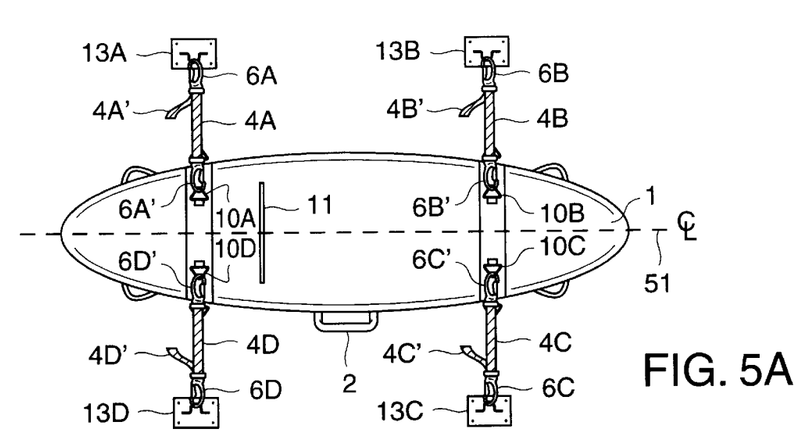
FIGS. 5A and 5B show the Pro Bag strapped to the top of a vehicle using the gutter units.
Figure 7:
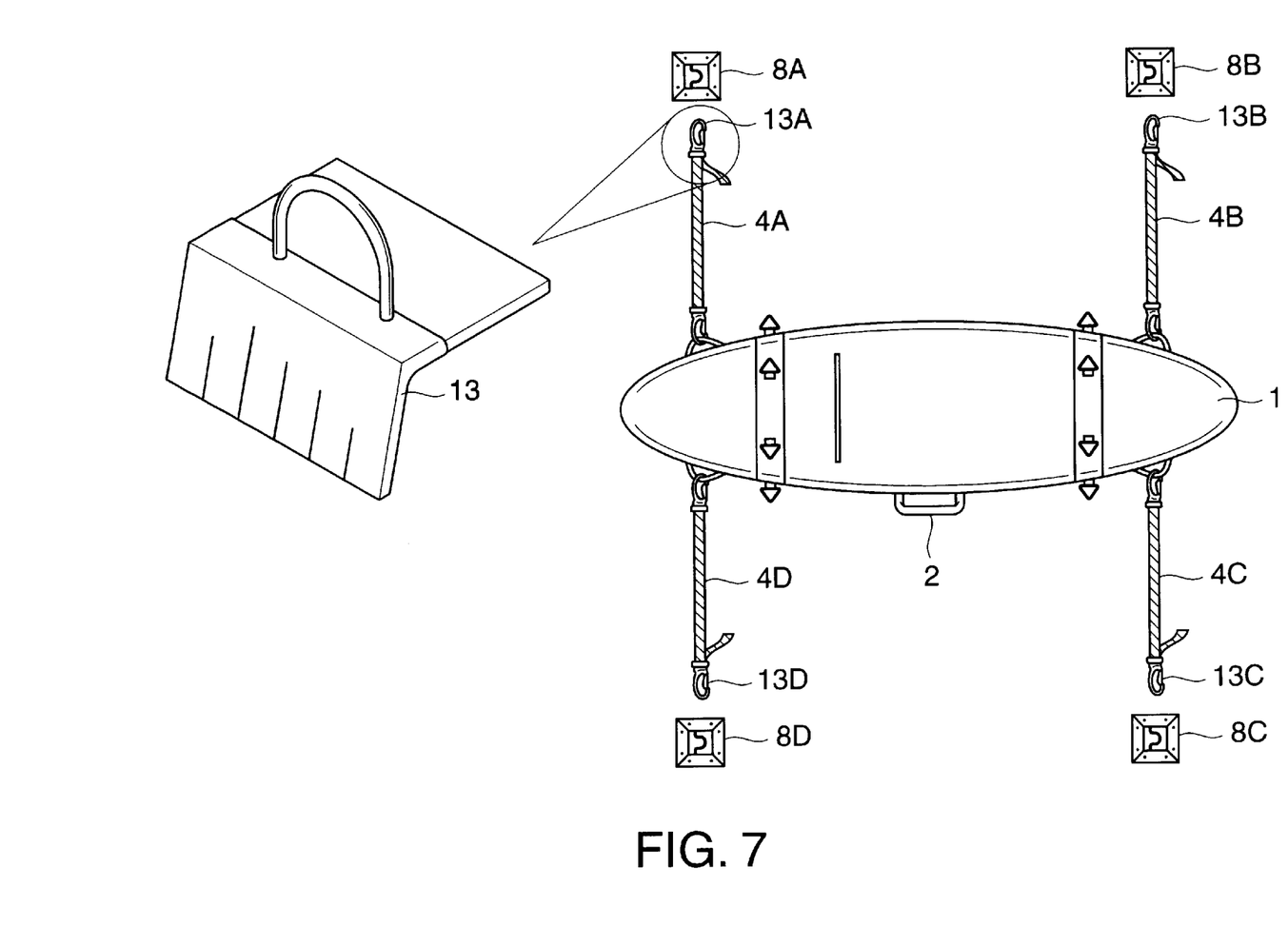
FIG. 7 presents an enlarged detail of a "Gutter unit".

The next use is to strap the Pro Bag 1 onto the top of a vehicle 52 (FIG. 5). First, one would clip the straps 4A to 4D to the D-rings 10A to 10D on top of the Pro Bag using clips 6A' to 6D' and then attach the free-ended stainless steel clips 6A to 6D to each of the four gutter units 13A to 13D (FIG. 7). The gutter units 13A to 13D are designed to fit snug to or attached to the inside of a car door's gutter (FIG. 5). By adjusting the tension on straps 4A to 4D by pulling on ends 4A' to 4D', Pro Bag 1 can be held tightly against the roof of vehicle 52 allowing the surfboard or other object inside Pro Bag 1 to be safely transported while held snugly against the roof of the vehicle. The padded underside of the bag allows the bottom surface of the bag to conform to the vehicle's roof. This reduces drag and thus helps reduce the reduction in fuel economy caused by carrying an object on the roof of a vehicle. Note that in one embodiment D-rings 10A to 10D are mounted on the top surface of Pro Bag 1 offset by a few inches from the centerline 51 of the Pro Bag 1 as shown in FIG. 5 so as to press against the top surface of Pro Bag 1 and thus provide a downward force on Pro Bag 1 perpendicular to the vehicle roof 53 to hold Pro Bag 1 snugly against the vehicle roof 53. D-rings 10A to 10D can be located on the top surface of Pro Bag 1 in any appropriate location which achieves this result.

Figure 3:
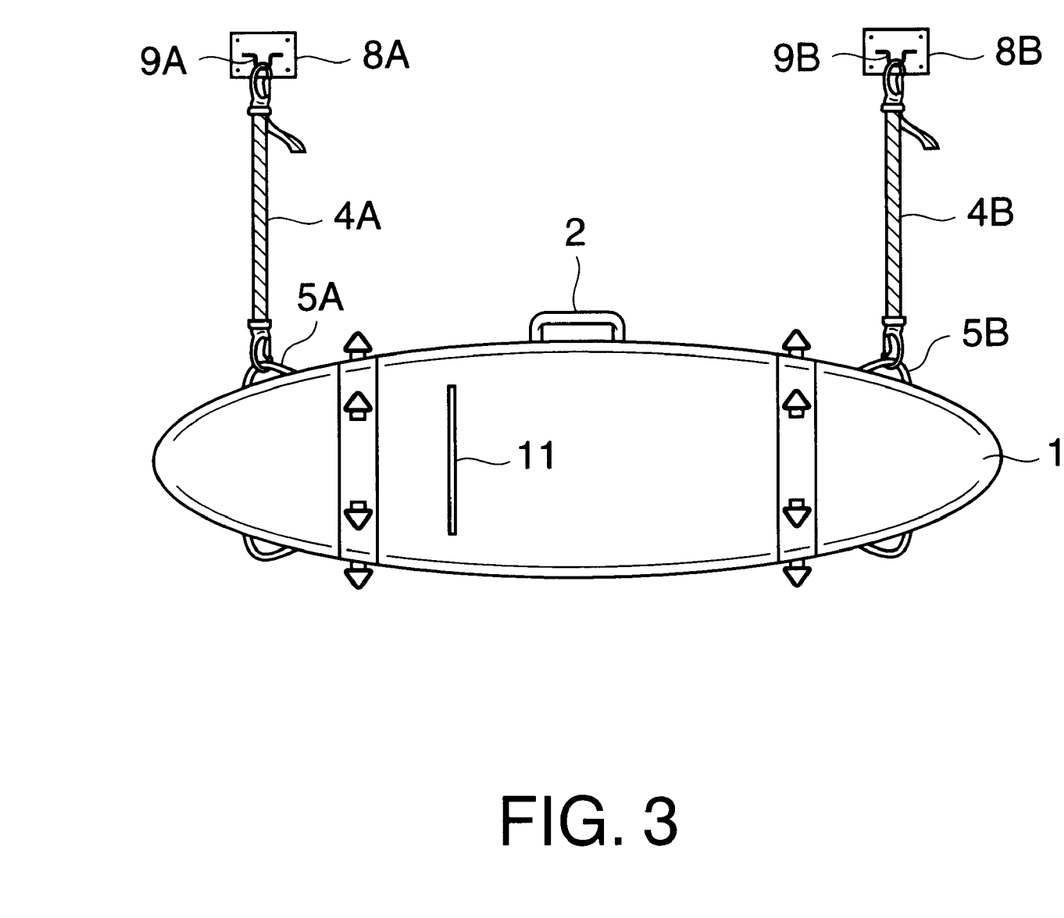
FIG. 3 is a view of the Pro Bag clipped onto a wall using only two wall units.

FIG. 3 shows the Pro Bag 1 used to store the surfboard or other object against a wall using two wall units 8A, 8B. Straps 4A and 4B are connected between "U-rings" 9A and 9B rotatably mounted in wall units 8A and 8B and between D-Rings 5A and 5B placed on one edge of Pro Bag 1. Thus, Pro Bag 1 hangs vertically from the wall taking minimum space. Because the Pro Bag 1 can still swing against the wall and thus possibly damage the object contained therein, additional wall units such as wall units 8C and 8D (FIG. 6) can also be used together with additional straps 4C and 4D to hold Pro Bag 1 in a relatively rigid position against the wall. This can be done by tightening ends 4A' to 4D' in a well-known manner to put straps 4A, 4B, 4C and 4D under tension thereby to prevent the Pro Bag 1 from moving out from the wall in any significant manner. Thus, FIGS. 3 and 6 show the Pro Bag hanging horizontally from the wall.

Figure 4:
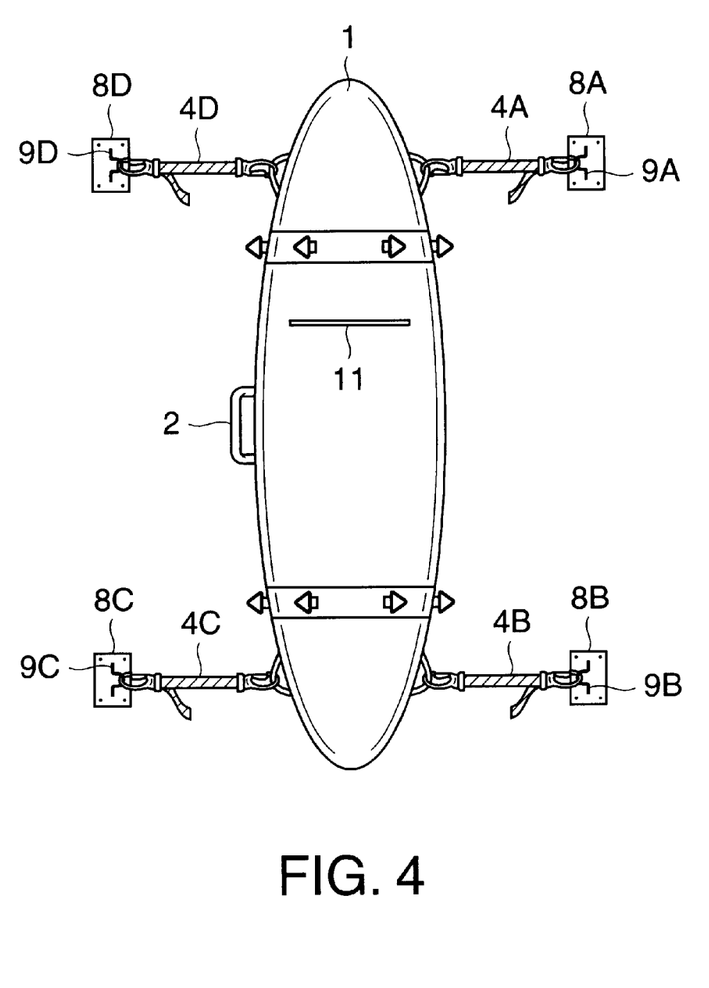
FIG. 4 is a view of the Pro Bag clipped onto the ceiling using all four wall units.

FIG. 4 shows the Pro Bag 1 mounting vertically on the wall with straps 4A through 4D connected to U-rings 9A to 9D contained in wall units 8A through 8D. This time the wall units however are mounted such that the Pro Bag 1 will hang vertically from the wall rather than horizontally.

Figure 5B:
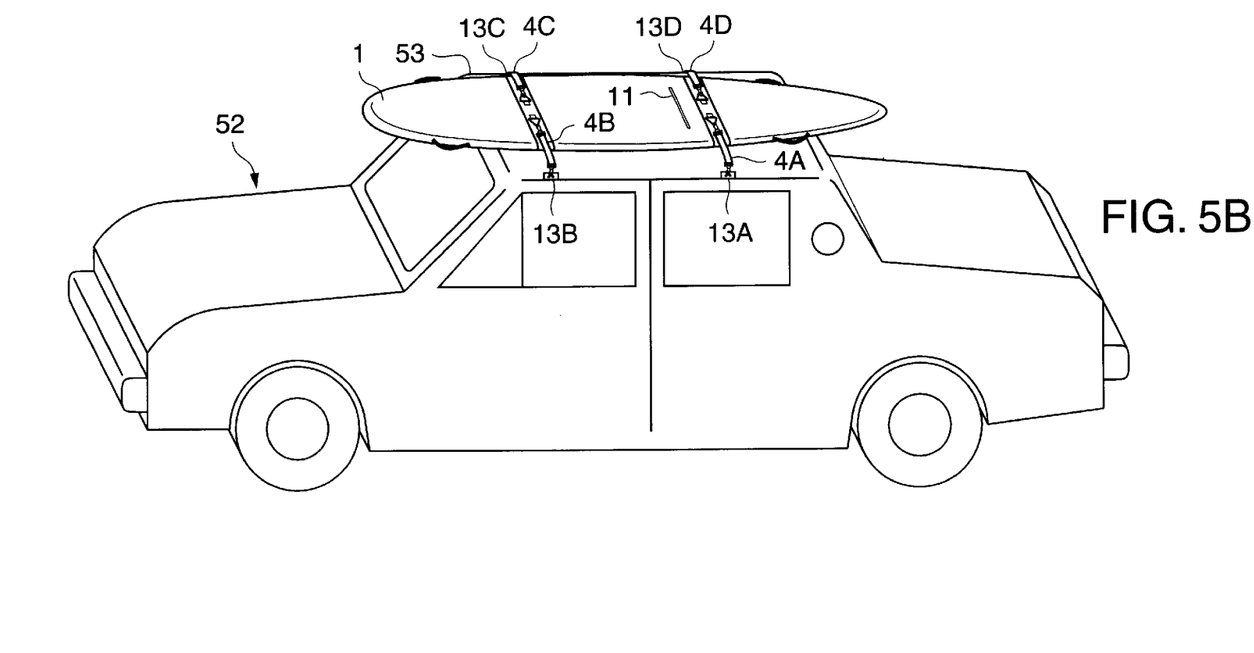

FIGS. 5A and 5B show the Pro Bag 1 utilizing straps 4A through 4D connected between D-rings 10A through 10D and gutter units 13A through 13D for mounting of the Pro Bag 1 on the roof 53 of a vehicle. The advantages of the location of D-rings 10A through 10D have been described above. While preferably straps 4A through 4D are made of nylon, by making straps 4A through 4D of an elastic material, straps 4A through 4D can be tensioned to hold the Pro Bag 1 against the roof of the car with a reasonably large force. When the elastic straps 4A to 4D are under sufficient tension, any stretching of straps 4A through 4D will be minimal and will not result in Pro Bag 1 loosening significantly from its position pressing snugly against and in contact with the roof of vehicle 52.

FIG. 6 shows the snap 6A, a common type of snap commercially available, used with this invention. Other types of snaps or clips can also be used if appropriate.

FIG. 7 shows the gutter unit 13 for use in mounting the Pro Bag 1 on the roof of a vehicle. Gutter unit 13 is attached to the distal end of adjustable straps 4A through 4D thereby allowing straps 4A through 4D to mount to the roof of the vehicle. Note that if desired, wall units 8A through 8D can also be adapted so that gutter unit 13 can be used on the distal ends of straps 4A through 4D to mount the Pro Bag 1 against a wall, as shown schematically in FIG. 6.

Figure 8:
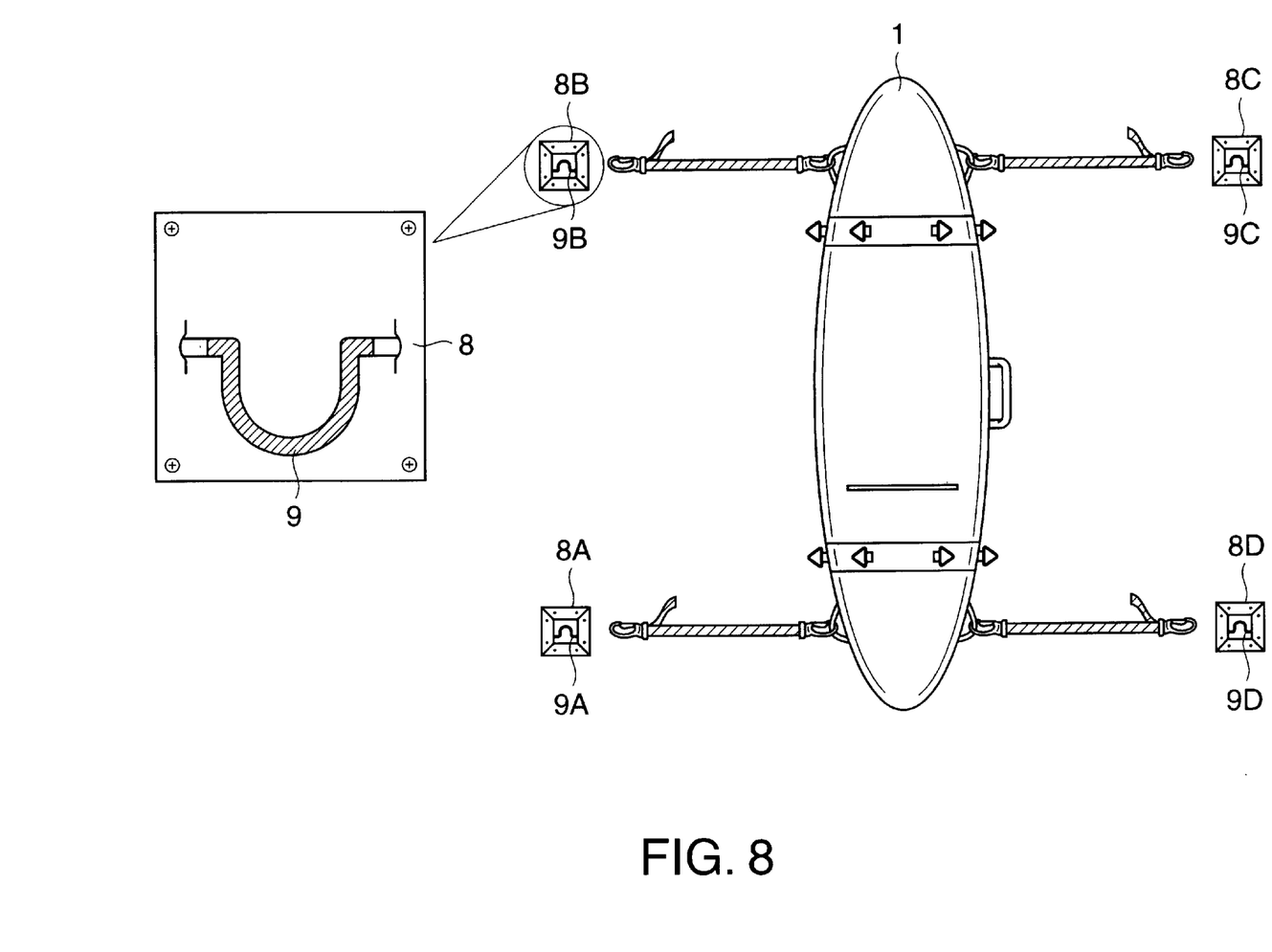
FIG. 8 presents an enlarged detail of a "Wall unit".

FIG. 8 shows the "U-ring" 9 rotatably mounted in wall unit 8. Shown in FIG. 8 also are four wall units 8A through 8D placed so as to hold Pro Bag 1 against the wall in a vertical position as shown in FIG. 8.

Figure 9:
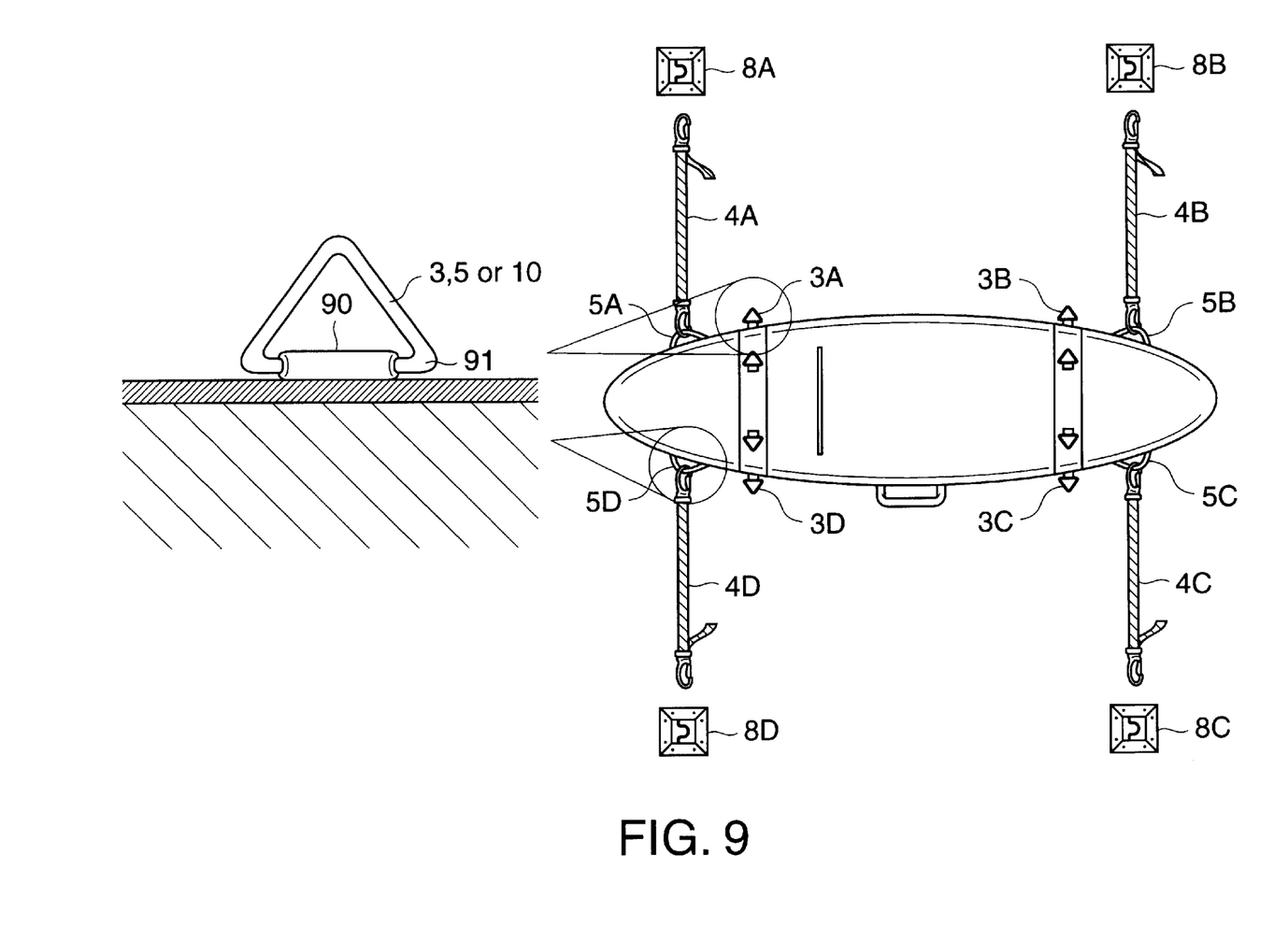
FIG. 9 presents an enlarged detail of a "D-ring".

FIG. 9 similarly shows the structure of D-rings 3A through 3D, 5A through 5D and 10A through 10D. While D-rings 3, 5 and 10 are shown essentially as triangularly-shaped, other shapes such as partially circular or elliptical can be used if desired and the term "ring" as used herein is intended to refer to all of these shapes. Note however that use of a D-ring of triangular-shape allows a flat portion of the D-ring to be mounted or sewn to Pro Bag 1 in a solid way to prevent undue stress from occurring at the mounting structure. Thus in FIG. 9 the mounting structure 90 comprises a weather proof solid materials sewn around the bottom portion 91 of D-ring 3, 5 or 10. Thus, the D-ring will be securely and stably mounted to the Pro Bag using this particular shape.

While various configurations of rings and support structures such as wall units have been shown, other shapes of these structures are appropriate for use with this invention. While this invention has been described as using straps made of nylon, other appropriate materials such as heavy canvas, rubberized cloth or any other appropriate material can be used if desired.

It will be apparent from the foregoing that while particular forms of the invention have been illustrated and described, various modifications can be made without departing from the spirit and scope of the invention. Accordingly, it is not intended that the invention be limited except by the appended claims.

What is claimed:

1. A container for storing, carrying and transporting an item such as a surfboard, wakeboard or snowboard, comprising:
   a bag that opens along one side;
   a storage pocket formed on a surface of the bag;
   a removable shoulder strap that attaches to the bag, the shoulder strap allowing the bag to be carried on the shoulder of a person;
   a first pair of rings attached to one edge of the bag for attachment to the removable shoulder strap; and
   at least four rings attached to one surface of the bag, two spaced apart rings on each side of a longitudinal centerline of the bag, said centerline running longitudinally along said one surface, for use in holding the bag firmly against an object; and
   at least four straps with a snap at the proximal end of each strap for attaching one strap to each of said at least four rings, the distal end of each strap containing a structure for attaching the distal end of the strap to a retaining structure on said object.

2. A container as in claim 1 wherein the object is a wall.
3. A container as in claim 1 wherein the object is a ceiling.
4. A container as in claim 1 wherein the object is a vehicle.
5. A container as in claim 4 wherein the object is the roof of a vehicle.
6. A container as in claim 5 wherein said at least four straps are adjustable thereby allowing the tension on each of the four straps to be adjusted to create a selected down force on the container when the container is mounted on the roof of the vehicle.
7. A container as in claim 2 in combination with at least two wall units mounted on a wall, said container being hung from said two wall units by two of said at least four straps attached to said first pair of rings attached to one edge, of the bag.
8. A container as in claim 1 including a second pair of rings attached to a second edge of the bag opposite said first edge.
9. A container as in claim 8 including a third pair of rings attached to said one edge, the rings in said third pair of rings being located further apart from each other than the rings in said first pair of rings.
10. A container as in claim 8 including at least two straps for attaching to said third pair of rings and for use in hanging said container from at least two wall units.
11. A container as in claim 9 including a fourth pair of rings attached to said second edge of the bag, said fourth pair of rings being opposite said third pair of rings.
12. A container as in claim 7 in combination with a second pair of wall units, said second pair of wall units being mounted on the wall and two of said at least four straps being used to attach said second pair of rings to said second pair of wall units.
13. A container as in claim 1 wherein said bag is made of nylon and said shoulder strap and said at least four straps are made of nylon.
14. A container as in claim 8 wherein said first pair of rings, said second pair of rings and said at least four rings are D-rings.
15. A container as in claim 14 wherein said D-rings are stainless steel.
16. A container as in claim 1 wherein said pocket is of sufficient size to hold the at least four straps and the removable shoulder strap.

* * * * *